(12) United States Patent
Harano et al.

(10) Patent No.: US 11,926,120 B2
(45) Date of Patent: *Mar. 12, 2024

(54) STEEL SHEET FOR HOT STAMPING

(71) Applicant: NIPPON STEEL CORPORATION, Tokyo (JP)

(72) Inventors: Takayuki Harano, Tokyo (JP); Yuji Sakiyama, Tokyo (JP); Akinobu Kobayashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/802,569

(22) PCT Filed: May 13, 2021

(86) PCT No.: PCT/JP2021/018160
§ 371 (c)(1),
(2) Date: Aug. 26, 2022

(87) PCT Pub. No.: WO2021/230311
PCT Pub. Date: Nov. 18, 2021

(65) Prior Publication Data
US 2023/0093517 A1 Mar. 23, 2023

(30) Foreign Application Priority Data
May 13, 2020 (JP) ................. 2020-084585

(51) Int. Cl.
*B32B 15/01* (2006.01)
*B21D 22/02* (2006.01)
(Continued)

(52) U.S. Cl.
CPC .......... *B32B 15/012* (2013.01); *B21D 22/022* (2013.01); *B32B 15/015* (2013.01);
(Continued)

(58) Field of Classification Search
CPC ... B32B 15/012; B32B 15/015; C22C 38/001; C22C 38/005; C22C 38/02; C22C 38/04;
(Continued)

(56) References Cited

U.S. PATENT DOCUMENTS

2016/0222485 A1\* 8/2016 Murakami .............. C22C 38/26
2017/0253941 A1   9/2017 Cobo et al.
(Continued)

FOREIGN PATENT DOCUMENTS

CN   107429342 A   12/2017
CN   107904535 A   4/2018
(Continued)

OTHER PUBLICATIONS

Ungár et al., "The contrast factors of dislocations in cubic crystals: the dislocation model of strain anisotropy in practice", Journal of Applied Crystallography, 1999, vol. 32, pp. 992-1002.

*Primary Examiner* — Katherine A Christy
(74) *Attorney, Agent, or Firm* — Birch, Stewart, Kolasch & Birch, LLP

(57) ABSTRACT

This steel sheet for hot stamping includes a base material, an Al—Si alloy plating layer in which the Al content is 75 mass % or more, the Si content is 3 mass % or more and the total of the Al content and the Si content is 95 mass % or more and a Ni plating layer in which the Ni content is more than 90 mass % in this order, the chemical composition of the base material is, by mass %, C: 0.01% or more and less than 0.70%, Si: 0.005% to 1.000%, Mn: 0.40% to 3.00%, Nb: 0.010% to 0.200%, a solid solution of Nb: 0.010% to 0.150%, sol. Al: 0.00020% to 0.50000%, P: 0.100% or less, S: 0.1000% or less, N: 0.0100% or less, Cu: 0% to 1.00%, Ni: 0% to 1.00%, V: 0% to 1.00%, Ti: 0% to 0.150%, Mo: 0% to 1.000%, Cr: 0% to 1.000%, B: 0% to 0.0100%, Ca: 0% to 0.010%, REM: 0% to 0.300%, and a remainder: Fe and an impurity, the Al—Si alloy plating layer has a thick-
(Continued)

ness of 7 to 148 μm, and the Ni plating layer has a thickness of more than 200 nm and 2500 nm or less.

4 Claims, 1 Drawing Sheet

(51) Int. Cl.
   *C22C 21/02* (2006.01)
   *C22C 38/00* (2006.01)
   *C22C 38/02* (2006.01)
   *C22C 38/04* (2006.01)
   *C22C 38/06* (2006.01)
   *C22C 38/08* (2006.01)
   *C22C 38/14* (2006.01)
   *C22C 38/16* (2006.01)
   *C22C 38/26* (2006.01)
   *C22C 38/32* (2006.01)
   *C22C 38/38* (2006.01)
   *C23C 2/26* (2006.01)

(52) U.S. Cl.
   CPC ............ *C22C 21/02* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/14* (2013.01); *C22C 38/16* (2013.01); *C22C 38/26* (2013.01); *C22C 38/32* (2013.01); *C22C 38/38* (2013.01); *C23C 2/26* (2013.01)

(58) Field of Classification Search
   CPC ......... C22C 38/06; C22C 38/08; C22C 38/14; C22C 38/16; C22C 38/26; C22C 38/32
   USPC ....................................................... 428/653
   See application file for complete search history.

(56) References Cited

U.S. PATENT DOCUMENTS

2018/0029102 A1    2/2018   Omori et al.
2019/0144963 A1*   5/2019   Georges ............... C21D 8/0478
                                                                   428/667

FOREIGN PATENT DOCUMENTS

| EP | 3 712 293 A1 | 9/2020 |
|---|---|---|
| JP | 4-246182 A | 9/1992 |
| JP | 6-346277 A | 12/1994 |
| JP | 11-269664 A | 10/1999 |
| WO | WO 2016/016707 A1 | 2/2016 |
| WO | WO 2017/187255 A1 | 11/2017 |
| WO | WO 2021/230306 A1 | 11/2021 |
| WO | WO 2021/230309 A1 | 11/2021 |

\* cited by examiner

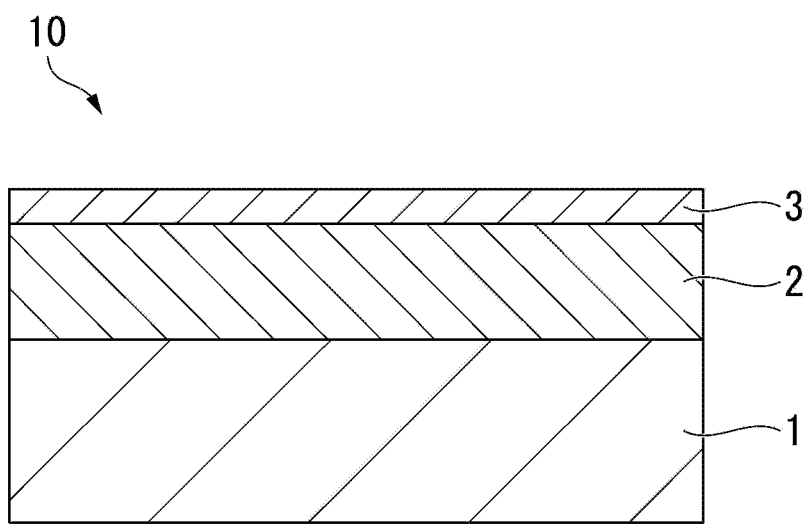

STEEL SHEET FOR HOT STAMPING

TECHNICAL FIELD

The present invention relates to a steel sheet for hot stamping. Priority is claimed on Japanese Patent Application No. 2020-084585, filed May 13, 2020, the content of which is incorporated herein by reference.

BACKGROUND ART

In recent years, there has been a demand for the weight reduction of automotive vehicle bodies from the viewpoint of environmental protection and resource saving, and the application of high strength steel sheets to automotive members has been accelerating. Automotive members are manufactured by press forming, and an increase in the strength of steel sheets does not only increase forming loads but also degrades formability, which creates a problem with the formability of high strength steel sheets into members with a complicated shape. In order to solve such a problem, the application of hot stamping techniques, in which a steel sheet is heated to a high temperature in an austenite region where the steel sheet softens and then formed by pressing, is underway. Hot stamping is drawing attention as a technique in which a quenching treatment is carried out in a die at the same time as pressing, thereby satisfying both formability into automotive members and the securement of the strength of automotive members.

In a case where hot stamping is carried out on a steel sheet that is a bare material on which plating or the like has not been carried out, there is a need to carry out hot stamping in a non-oxidative atmosphere in order to suppress the formation of scale during heating and the decarburization of the surface layer. However, even when hot stamping is carried out in a non-oxidative atmosphere, the steel sheet is in the atmospheric atmosphere when the steel sheet is conveyed from a heating furnace to a pressing machine, thus, a scale is formed on the surface of the hot-stamped steel sheet. The scale on the surface of the steel sheet is poorly adhesive and easily exfoliates, which creates a concern of an adverse influence on other steps. Therefore, there is a need to remove the scale by shot blasting or the like. Shot blasting has a problem of affecting the shapes of steel sheets. In addition, there is a problem in that the productivity of a hot stamping step deteriorates due to a scale removal step.

In order to improve the adhesion of scale on the surface of a steel sheet, there is a method in which plating is formed on the surface of the steel sheet. When plating is formed, since scale that is formed on the surface of a steel by hot stamping has favorable adhesion, a step of removing scale becomes unnecessary. Therefore, the productivity of the hot stamping step is improved.

As a method for forming plating on the surface of a steel sheet, a method in which Zn plating or Al plating is formed is conceivable; however, in a case where Zn plating is used, there is a problem with liquid metal embrittlement (hereinafter, referred to as LME). LME refers to a phenomenon in which, when tensile strength is imparted with a liquid metal in contact with the surface of a solid metal, the solid metal that intrinsically exhibits ductility embrittles. Zn has a low melting point, molten Zn intrudes along prior austenite grain boundaries of Fe during hot stamping, and micro-cracks are initiated in steel sheets.

In a case where Al plating is provided on a steel sheet, the above-described LME problem is not caused, but a reaction is caused between Al and water on the surface of the Al plating during hot stamping, and hydrogen is generated. Therefore, there is a problem in that the amount of intruding hydrogen into the steel sheet is large. When the amount of hydrogen intruding into the steel sheet is large, stress that is loaded after hot stamping leads to cracking of the steel sheet (hydrogen embrittlement).

Patent Document 1 discloses a technique for suppressing the intrusion of hydrogen into steel at a high temperature by enriching the surface layer region of a steel sheet with nickel.

Patent Document 2 discloses a technique for suppressing the intrusion of hydrogen into steel by coating a steel sheet with a barrier pre-coat containing nickel and chromium and having a weight ratio Ni/Cr of 1.5 to 9.

However, in the methods of Patent Documents 1 and 2, in a hot-stamping formed body after hot stamping, Fe diffuses up to the surface of the hot-stamping formed body, which creates a problem in that the corrosion of the hot-stamping formed body cannot be sufficiently suppressed.

CITATION LIST

Patent Document

[Patent Document 1]
PCT International Publication No. WO 2016/016707
[Patent Document 2]
PCT International Publication No. WO 2017/187255

SUMMARY OF THE INVENTION

Problems to be Solved by the Invention

The present invention has been made in consideration of the above-described problem, and an objective of the present invention is to provide a steel sheet for hot stamping from which a hot-stamping formed body having excellent corrosion resistance can be manufactured.

Means for Solving the Problem

As a result of intensive studies, the present inventors found that, when a steel sheet for hot stamping including an Al—Si alloy plating layer includes a Ni plating layer having a desired average layer thickness (thickness) on the Al—Si alloy plating layer and contains a desired amount of a solid solution of Nb in a steel sheet that is a substrate of the steel sheet for hot stamping, it is possible to sufficiently suppress the corrosion of hot-stamping formed bodies.

The present invention has been made by further progressing studies based on the above-described finding, and the gist thereof is as described below.

(1) A steel sheet for hot stamping according to one aspect of the present invention including:
  a base material,
  an Al—Si alloy plating layer in which an Al content is 75 mass % or more, a Si content is 3 mass % or more and a total of the Al content and the Si content is 95 mass % or more, and
  a Ni plating layer having a Ni content of more than 90 mass %
  in this order,
  in which a chemical composition of the base material is, by mass %,
  C: 0.01% or more and less than 0.70%,
  Si: 0.005% to 1.000%,
  Mn: 0.40% to 3.00%, Nb: 0.010% to 0.200%,
a solid solution of Nb: 0.010% to 0.150%,
sol. Al: 0.00020% to 0.50000%,
P: 0.100% or less,
S: 0.1000% or less,
N: 0.0100% or less,
Cu: 0% to 1.00%,
Ni: 0% to 1.00%,
V: 0% to 1.00%,
Ti: 0% to 0.150%,
Mo: 0% to 1.000%,
Cr: 0% to 1.000%,
B: 0% to 0.0100%,
Ca: 0% to 0.010%,
REM: 0% to 0.300%, and
a remainder: Fe and an impurity,
the Al—Si alloy plating layer has a thickness of 7 to 148 μm, and
the Ni plating layer has a thickness of more than 200 nm and 2500 nm or less.

(2) The steel sheet for hot stamping according to (1), in which the chemical composition of the base material may contain, by mass %, one or two or more selected from the group consisting of
Cu: 0.005% to 1.00%,
Ni: 0.005% to 1.00%,
V: 0.01% to 1.00%,
Ti: 0.010% to 0.150%,
Mo: 0.005% to 1.000%,
Cr: 0.050% to 1.000%,
B: 0.0005% to 0.0100%,
Ca: 0.001% to 0.010%, and
REM: 0.001% to 0.300%.

Effects of the Invention

According to the aspect of the present invention, it is possible to obtain a steel sheet for hot stamping from which a hot-stamping formed body having excellent corrosion resistance can be manufactured.

BRIEF DESCRIPTION OF DRAWINGS

The FIGURE is a schematic cross-sectional view of a steel sheet for hot stamping according to an embodiment of the present invention.

EMBODIMENT(S) FOR IMPLEMENTING THE INVENTION

<Steel Sheet for Hot Stamping>
As a result of intensive studies, the present inventors found that, in a case where an Al-plated steel sheet is hot-stamped, Fe diffuses to the surface and the corrosion resistance deteriorates.

As a result of additional intensive studies, the present inventors obtained the following findings.
(A) When the average layer thickness (thickness) of a Ni plating layer is more than 200 nm, it is possible to suppress the diffusion of Fe to the surface of a hot-stamping formed body.
(B) When a sufficient amount of a solid solution of Nb is present in a steel sheet that serves as a substrate of a steel sheet for hot stamping, the alloying rate (diffusion rate) of Fe from the interface between the steel sheet and an Al plating layer toward the surface of the hot-stamping formed body decreases, and it is possible to further suppress the diffusion of Fe.

In a steel sheet for hot stamping according to the present embodiment, the configuration of the steel sheet for hot stamping was determined based on the above-described findings. In the steel sheet for hot stamping according to the present embodiment, an intended effect of the present invention can be obtained due to the synergistic effects of individual plating configurations. As shown in the FIGURE, a steel sheet for hot stamping 10 includes a steel sheet (base material) 1, an Al—Si alloy plating layer 2 and a Ni plating layer 3. Hereinafter, each configuration will be described. In the present specification, numerical ranges expressed using "to" include numerical values before and after "to" as the lower limit value and the upper limit value. Numerical values expressed with "more than" and "less than" are not included in numerical ranges. Regarding chemical compositions, "%" indicates "mass %" in all cases.

(Steel Sheet (Base Material))
The chemical composition of the steel sheet (base material) that serves as the steel sheet (base material) 1 of the steel sheet for hot stamping 10 according to the present embodiment is, by mass %, C: 0.01% or more and less than 0.70%, Si: 0.005% to 1.000%, Mn: 0.40% to 3.00%, sol. Al: 0.00020% to 0.50000%, Nb: 0.010% to 0.200%, a solid solution of Nb: 0.010% to 0.150%, P: 0.100% or less, S: 0.1000% or less, N: 0.0100% or less. Cu: 0% to 1.00%, Ni: 0% to 1.00%, V: 0% to 1.00%. Ti: 0% to 0.150%, Mo: 0% to 1.000%, Cr: 0% to 1.000%, B: 0% to 0.0100%, Ca: 0% to 0.010%, REM: 0% to 0.300%, and a remainder: Fe and an impurity.

"C: 0.01% or more and less than 0.70%"
C is an important element for securing hardenability. When the C content is less than 0.01%, it becomes difficult to obtain sufficient hardenability, and the tensile strength decreases. Therefore, the C content may be 0.01% or more, 0.08% or more, 0.18% or more or 0.25% or more. On the other hand, when the C content is 0.70% or more, a coarse carbide is formed, and brittle fracture is likely to occur. Therefore, the C content is preferably set to less than 0.70%. The C content is preferably 0.38% or less.

"Si: 0.005% to 1.000%"
Si is an element that is contained to secure hardenability. When the Si content is less than 0.005%, the above-described effect cannot be obtained. Therefore, the Si content is set to 0.005% or more. Amore preferable Si content is 0.100% or more. In a case where Cu is contained, the Si content is preferably set to 0.350% or more in order to suppress the hot embrittlement of Cu. When more than 1.000% of Si is contained, the austenite transformation temperature ($Ac_3$ or the like) becomes extremely high, and there is a case where the cost necessary for heating for hot stamping increases or ferrite remains during the heating for hot stamping to decrease the tensile strength of a hot-stamping formed body. Therefore, the Si content is set to 1.000% or less. The Si content is preferably 0.800% or less. In a case where u is contained, since the temperature of the austenite transformation temperature becomes high, the Si content is preferably 0.600% or less. The Si content may be 0.400% or less or 250% or less.

"Mn: 0.40% to 3.00%"
Mn is an element necessary to ensure a solid solution of Nb. When the Mn content is less than 0.40%, it is not possible to suppress the precipitation of a Nb carbonitride, and it is difficult to obtain a desired amount of a solid solution of Nb. Therefore, the Mn content is set to 0.40% or more. The Mn content is preferably 0.80% or more. On the other hand, when the Mn content is set to more than 3.00%, since a coarse inclusion is generated in steel, and breakage is likely to occur, the Mn content is set to 3.00% or less. The Mn content is preferably 2.00% or less.

"sol. Al: 0.00020% to 0.50000%"

Al is an element having an action of deoxidizing molten steel to improve the quality of the steel (suppressing the generation of a defect such as a blowhole in steel). When the sol. Al content is less than 0.00020%, since molten steel is not sufficiently deoxidized, and the above-described effect cannot be obtained, the sol. Al content is set to 0.00020% or more. The sol. Al content is preferably 0.00100% or more or 0.00200% or more. On the other hand, when the sol. Al content exceeds 0.50000%, a coarse oxide is generated in steel, and the brittle fracture of the hot-stamping formed body is likely to occur. Therefore, the sol. Al content is set to 0.50000% or less. The sol. Al content is preferably 0.40000% or less or 0.30000% or less. sol. Al means acid-soluble Al and refers to the total amount of the solid solution of Al that is present in steel in a solid solution state and Al that is present in steel as an acid-soluble precipitate such as AlN.

"Solid solution of Nb: 0.010% to 0.150%"

A solid solution of Nb decreases the diffusion rate of Fe. In a case where the amount of a solid solution of Nb is less than 0.010%, the above-described effect cannot be obtained. Therefore, the amount of the solid solution of Nb is 0.010% or more. A more preferable amount of the solid solution of Nb is 0.030% or more. A still more preferable amount of the solid solution of Nb is 0.050% or more. On the other hand, even when more than 0.150% of the solid solution of Nb is contained, the above-described effect is saturated, and thus the amount of the solid solution of Nb is set to 0.150% or less. The amount of the solid solution of Nb is more preferably 0.100% or less. The solid solution of Nb refers to Nb that is present in steel in a solid solution state.

"Nb: 0.010% to 0.200%"

In a case where the Nb content is less than 0.010%, it is not possible to set the amount of the solid solution of Nb to 0.010% or more. Therefore, the Nb content is 0.010% or more. A more preferable Nb content is 0.030% or more. A still more preferable Nb content is 0.050% or more. On the other hand, even when the Nb content is more than 0.200%, Nb is not capable of forming a solid solution, and a carbide is coarsened, and thus the Nb content is set to 0.200% or less. The Nb content is more preferably 0.100% or less.

"P: 0.100% or less"

P is an element that is segregated in grain boundaries and degrades the strength of the grain boundaries. When the P content exceeds 0.100%, the strength of grain boundaries significantly decreases, and the brittle fracture of the hot-stamping formed body is likely to occur. Therefore, the P content is preferably set to 0.100% or less. The P content is preferably 0.050% or less. A more preferable P content is 0.010% or less. The lower limit of the P content is not particularly limited; however, when the lower limit is decreased to lower than 0.0005%, the dephosphorization cost increases significantly, which is not preferable economically, and thus the lower limit of the P content may be set to 0.0005% in actual operation.

"S: 0.1000% or less"

S is an element that forms an inclusion in steel. When the S content of the base material exceeds 0.1000%, a large amount of an inclusion is generated in steel, and the brittle fracture of the hot-stamping formed body is likely to occur. Therefore, the S content is preferably set to 0.1000% or less. The S content is preferably 0.0050% or less. The lower limit of the S content is not particularly limited; however, when the lower limit is decreased to lower than 0.00015%, the desulfurization cost increases significantly, which is not preferable economically, and thus the lower limit of the S content may be set to 0.00015% in actual operation.

"N: 0.0100% or less"

N is an impurity element and an element that forms a nitride in steel to degrade the toughness and tensile strength of the hot-stamping formed body. When the N content exceeds 0.0100%, a coarse nitride is generated in steel, and the brittle fracture of the hot-stamping formed body is likely to occur. Therefore, the N content is set to 0.0100% or less. The N content is preferably 0.0050% or less. The lower limit of the N content is not particularly limited; however, when the lower limit is decreased to lower than 0.0001%, the denitrification cost increases significantly, which is not preferable economically, and thus the lower limit may be set to 0.0001% in actual operation.

The steel sheet that configures the steel sheet for hot stamping 10 according to the present embodiment may contain, instead of some of Fe, one or two or more selected from the group consisting of Cu, Ni, V, Ti, Mo, Cr, B, Ca and REM as an arbitrary element. In a case where the following arbitrary element is not contained, the content thereof is 0%.

"Cu: 0% to 1.00%"

Cu has an action of diffusing up to a plating layer of a hot stamping member during hot stamping to reduce hydrogen that intrudes during heating in the manufacturing of the hot stamping member. Therefore, Cu may be contained as necessary. In addition, Cu is an effective element for enhancing the hardenability of steel to stably secure the strength of the quenched hot-stamping formed body. In a case where Cu is contained, the Cu content is preferably set to 0.005% or more in order to reliably exhibit the above-described effect. The Cu content is more preferably 0.150% or more. On the other hand, even when more than 1.00% of Cu is contained, the above-described effect is saturated, and thus the Cu content is preferably set to 1.00% or less. The Cu content is more preferably 0.350% or less.

"Ni: 0% to 1.00%"

Ni is an important element to suppress hot embrittlement caused by Cu during the manufacturing of the steel sheet and secure stable production, and thus Ni may be contained. When the Ni content is less than 0.005%, there is a case where the above-described effects cannot be sufficiently obtained. Therefore, the Ni content is preferably 0.005% or more. The Ni content is preferably 0.05% or more. On the other hand, when the Ni content exceeds 1.00%, the limit hydrogen amount of the steel sheet for hot stamping decreases. Therefore, the Ni content is set to 1.00% or less. The Ni content is preferably 0.60% or less.

"V: 0% to 1.00%"

V is an element that forms a fine carbide and improves the limit hydrogen amount of steel by a refining effect or hydrogen trapping effect thereof. Therefore, V may be contained. In order to obtain the above-described effects, 0.01% or more of V is preferably contained, and 0.05% or more of V is more preferably contained. However, when the V content exceeds 1.00%, the above-described effects are saturated, and the economic efficiency decreases. Therefore, in the case of containing V, the V content is set to 1.00% or less.

"Ti: 0% to 0.150%"

Ti is an element that contributes to improvement in the strength of the hot-stamping formed body by solid solution strengthening and thus may be contained as necessary. In a case where Ti is contained, the Ti content is preferably set to 0.010% or more in order to reliably exhibit the above-described effect. The Ti content is preferably 0.020% or more. On the other hand, even when more than 0.150% of Ti is contained, the above-described effect is saturated, and thus the Ti content is preferably set to 0.150% or less. The Ti content is more preferably 0.120% or less.

"Mo: 0% to 1.000%"

Mo is an element that contributes to improvement in the strength of the hot-stamping formed body by solid solution strengthening and thus may be contained as necessary. In a case where Mo is contained, the Mo content is preferably set to 0.005% or more in order to reliably exhibit the above-described effect. The Mo content is more preferably 0.010% or more. On the other hand, even when more than 1.000% of Mo is contained, the above-described effect is saturated, and thus the Mo content is preferably set to 1.000% or less. The Mo content is more preferably 0.800% or less.

"Cr: 0% to 1.000%"

Cr is an element that contributes to improvement in the strength of the hot-stamping formed body by solid solution strengthening and thus may be contained as necessary. In a case where Cr is contained, the Cr content is preferably set to 0.050% or more in order to reliably exhibit the above-described effect. The Cr content is more preferably 0.100% or more. On the other hand, even when more than 1.000% of Cr is contained, the above-described effect is saturated, and thus the Cr content is preferably set to 1.000% or less. The Cr content is more preferably 0.800% or less.

"B: 0% to 0.0100%"

B is an element that is segregated in grain boundaries to improve the strength of the grain boundaries and thus may be contained as necessary. In a case where B is contained, the B content is preferably set to 0.0005% or more in order to reliably exhibit the above-described effect. The B content is preferably 0.0010% or more. On the other hand, even when more than 0.0100% of B is contained, the above-described effect is saturated, and thus the B content is preferably set to 0.0100% or less. The B content is more preferably 0.0075% or less.

"Ca: 0% to 0.010%"

Ca is an element having an action of deoxidizing molten steel to improve the quality of the steel. In order to reliably exhibit this action, the Ca content is preferably set to 0.001% or more. On the other hand, even when more than 0.010% of Ca is contained, the above-described effect is saturated, and thus the Ca content is preferably set to 0.010% or less.

"REM: 0% to 0.300%"

REM is an element having an action of deoxidizing molten steel to improve the quality of the steel. In order to reliably exhibit this action, the REM content is preferably set to 0.001% or more. On the other hand, even when more than 0.300% of REM is contained, the above-described effect is saturated, and thus the REM content is preferably set to 0.300% or less. In the present embodiment, REM refers to a total of 17 elements consisting of Sc, Y, and lanthanoids, and the REM content refers to the total amount of these elements.

"Remainder being Fe and Impurity"

The remainder of the chemical composition of the base material 1 that configures the steel sheet for hot stamping 10 according to the present embodiment is Fe and an impurity. As the impurity, exemplified is an element that is inevitably incorporated from a steel raw material or a scrap and/or in a steelmaking process or intentionally added and is permitted to an extent that the properties of hot-stamping formed bodies, which are the steel sheet for hot stamping 10 according to the present embodiment that have been hot-stamped, are not impaired.

The above-described chemical composition of the base material 1 may be measured by an ordinary analytical method. For example, the chemical composition may be measured using inductively coupled plasma-atomic emission spectrometry (ICP-AES). C and S may be measured using an infrared absorption method after combustion, and N may be measured using an inert gas melting-thermal conductivity method. The chemical composition needs to be analyzed after the plating layer on the surface is removed by machining, sol. Al may be measured by ICP-AES using a filtrate obtained by hydrolyzing a specimen with an acid.

The amount of the solid solution of Nb is measured by the following method. An electrolytic extraction (electrolytic solution: 10 vol % of acetylacetone-1 mass % of tetraammonium chloride-methanol) residue is separated, then, only this residue is dissolved by a sulfuric phosphoric acid white fume treatment, the solution is analyzed by ICP-AES, and the amount of Nb precipitated (insol. Nb) is determined. insol. Nb is subtracted from the total amount of Nb in the base material 1, thereby determining the amount of a solid solution of Nb (sol. Nb). At this time, insol. Nb is rounded down after four decimal places (mass %). The total amount of Nb in the base material 1 is determined according to JIS G 1258-4 (2007).

"Metallographic Structure"

Next, the metallographic structure of the base material 1 that configures the steel sheet for hot stamping 10 according to the present embodiment will be described. In the metallographic structure of the base material 1 of the steel sheet for hot stamping 10, the area ratio of ferrite is preferably 10% or more in terms of the area ratio in a cross section. A more preferable area ratio of ferrite is 20% or more. The area ratio of ferrite is preferably 40% or less in terms of the area ratio in a cross section. A more preferable area ratio of ferrite is 30% or less. The area ratio of pearlite is preferably 10% or more in terms of the area ratio in a cross section. A more preferable area ratio of pearlite is 20% or more. The area fraction of pearlite is preferably 40% or less. A more preferable area ratio of pearlite is 30% or less. The area ratio of bainite is preferably 20% or more in terms of the area ratio in a cross section. A more preferable area ratio of bainite is 30% or more. The area fraction of pearlite is preferably 80% or less. A more preferable area ratio of pearlite is 70% or less. The remainder may be martensite or residual austenite. The area ratio of the remainder in microstructure may be less than 5%.

(Measurement Method of Area Ratios of Ferrite, Pearlite and Bainite)

The area ratios of ferrite and pearlite are measured by the following method. A cross section parallel to a rolling direction at the central position in the sheet width direction is finished into a mirror-like surface and polished for eight minutes using colloidal silica containing no alkaline solution at room temperature to remove strain introduced into the surface layer of a sample. At an arbitrary position in the longitudinal direction of the sample cross section, a region from a ⅛ depth of the sheet thickness from the surface to a ⅜ depth of the sheet thickness from the surface, which is 50 µm in length, is measured at measurement intervals of 0.1 µm by an electron backscatter diffraction method such that a ¼ depth of the sheet thickness from the surface can be analyzed to obtain crystal orientation information. For the measurement, an instrument composed of a thermal field emission-type scanning electron microscope (JSM-7001F manufactured by JEOL Ltd.) and an EBSP detector (DVC 5-type detector manufactured by TSL) is used. In this case, the degree of vacuum in the instrument is set to $9.6 \times 10^{-5}$ Pa or less, the accelerating voltage is set to 15 kV, the irradiation current level is set to 13, and the irradiation level of an electron beam is set to 62. Furthermore, a reflected electron image is captured at the same visual field.

First, crystal grains where ferrite and cementite are precipitated in layers are specified from the reflected electron image, and the area ratio of the crystal grains is calculated, thereby obtaining the area ratio of pearlite. After that, for crystal grains except the crystal grains determined as pearlite, from the obtained crystal orientation information, regions where the grain average misorientation value is 1.0° or less are determined as ferrite using a "Grain Average Misorientation" function mounted in software "OIM Analysis (registered trademark)" included in the EBSP analyzer. The area ratio of the regions determined as ferrite is obtained, thereby obtaining the area ratio of ferrite.

Regions where the grain average misorientation value is more than 1.0° and 5.0° or less are determined as bainite using the above-described function. The area ratio of the regions determined as bainite is obtained, thereby obtaining the area ratio of bainite.

(Determination Method of Area Ratio of Remainder)

The area ratio of the remainder in the present embodiment is a value obtained by subtracting the total area of ferrite, pearlite and bainite from 100%.

The sheet thickness of the base material 1 of the steel sheet for hot stamping 10 according to the present embodiment is not particularly limited, but is preferably 0.4 mm or more from the viewpoint of the weight reduction of vehicle bodies. The sheet thickness of the base material 1 is more preferably 0.8 mm or more, 1.0 mm or more or 1.2 mm or more. The sheet thickness of the base material 1 is preferably set to 6.0 mm or less. The sheet thickness of the base material 1 is more preferably 5.0 mm or less, 4.0 mm or less, 3.2 mm or less or 2.8 mm or less.

(Al—Si Alloy Plating Layer)

The Al—Si alloy plating layer 2 of the steel sheet for hot stamping 10 according to the present embodiment is provided as an upper layer of the base material 1. The Al—Si alloy plating layer 2 is plating containing Al and Si as main components. Here, the expression "containing Al and Si as main component" means that at least the Al content is 75 mass % or more, the Si content is 3 mass % or more and the total of the Al content and the Si content is 95 mass % or more. The Al content in the Al—Si alloy plating layer 2 is preferably 80 mass % or more. The Al content in the Al—Si alloy plating layer 2 is preferably 95 mass % or less. When the Al content in the Al—Si alloy plating layer 2 is in this range, it is possible to prevent the formation of scale on the surface of the steel sheet during hot stamping.

The Si content in the Al—Si alloy plating layer 2 is 3 mass % or more. The Si content in the Al—Si alloy plating layer 2 is more preferably 6 mass % or more. The Si content in the Al—Si alloy plating layer 2 is 20 mass % or less. The Si content is more preferably 12 mass % or less. When the Si content in the Al—Si alloy plating layer 2 is 3 mass % or more, alloying of Fe and Al can be suppressed. In addition, when the Si content in the Al—Si alloy plating layer 2 is 20 mass % or less, it is possible to obtain favorable adhesion of scale. The total of the Al content and the Si content may be 97 mass % or more, 98 mass % or more or 99 mass % or more. The remainder in the Al—Si alloy plating layer 2 is Fe and an impurity. As the impurity, a component that is inevitably incorporated during the manufacturing of the Al—Si alloy plating layer 2, a component in the base material 1 or the like is an exemplary example.

The average layer thickness (thickness) of the Al—Si alloy plating layer 2 of the steel sheet for hot stamping 10 according to the present embodiment is 7 μm or more. This is because, when the thickness of the Al—Si alloy plating layer 2 is less than 7 μm, it is not possible to sufficiently suppress the formation of scale during hot stamping. A more preferable thickness of the Al—Si alloy plating layer 2 is 12 μm or more, 15 μm or more, 18 μm or more or 22 μm or more. When the thickness of the Al—Si alloy plating layer 2 is more than 148 μm, not only is the above-described effect saturated, but the cost also increases, and thus the thickness of the Al—Si alloy plating layer 2 is 148 μm or less. A more preferable thickness of the Al—Si alloy plating layer 2 is 100 μm or less, 60 μm or less, 45 μm or less or 37 μm or less.

The thickness of the Al—Si alloy plating layer 2 is measured as described below. The steel sheet for hot stamping 10 is cut in the sheet thickness direction, and then the cross section of the steel sheet for hot stamping 10 is polished. On the polished cross section of the steel sheet for hot stamping 10, a region from the surface of the steel sheet for hot stamping 10 to the base material 1 is linearly analyzed by a ZAF method with an electron probe microanalyzer (FE-EPMA), and, among detected components, the Al concentration and the Si concentration are measured. As the measurement conditions, the accelerating voltage needs to set to 15 kV, the beam diameter needs to be set to approximately 100 nm, the irradiation time per point needs to be set to 1000 ms, and the measurement pitches need to be set to 60 nm. A region where the Si content is 3 mass % or more and the total of the Al content and the Si content is 95 mass % or more is determined as the Al—Si alloy plating layer 2. The layer thickness of the Al—Si alloy plating layer 2 is the length of the above-described region in the sheet thickness direction. The layer thicknesses of the Al—Si alloy plating layer 2 are measured at five positions at 5 μm intervals, and the arithmetic average of the obtained values is regarded as the thickness of the Al—Si alloy plating layer 2.

Regarding the Al content and the Si content in the Al—Si alloy plating layer 2, according to a testing method described in JIS K 0150 (2005), a test piece is collected, the Al content and the Si content are measured at a ½ position of the total thickness of the Al—Si alloy plating layer 2, whereby the Al content and the Si content in the Al—Si alloy plating layer 2 in the steel sheet for hot stamping 10 can be obtained.

(Ni Plating Layer)

The Ni plating layer 3 of the steel sheet for hot stamping 10 according to the present embodiment is provided on the Al—Si alloy plating layer 2 as an upper layer of the Al—Si alloy plating layer 2. Between the Al—Si alloy plating layer 2 and the Ni plating layer 3, an Al oxide coating formed by the oxidation of the surface of the Al—Si alloy plating layer may be present.

The average layer thickness (thickness) of the Ni plating layer 3 according to the present embodiment is more than 200 nm. A more preferable thickness of the Ni plating layer 3 is 280 nm or more, 350 nm or more, 450 nm or more, 560 nm or more or 650 nm or more. When the thickness of the Ni plating layer 3 is 200 nm or less, it is not possible to sufficiently suppress the diffusion of Fe to the surface of the hot-stamping formed body. In addition, from the viewpoint of suppressing the diffusion of Fe, the thickness of the Ni plating layer 3 is desirably as thick as possible. On the other hand, from the viewpoint of the cost, the thickness of the Ni plating layer 3 is 2500 nm or less. The thickness of the Ni plating layer 3 is preferably 1500 nm or less, 1200 nm or less or 1000 nm or less and more preferably 900 nm or less or 730 nm or less. When the thickness of the Ni plating layer 3 is more than 2500 nm, the effect on suppressing the diffusion of Fe is saturated.

When the Ni content in the Ni plating layer 4 is 90 mass % or less, there is a case where the effect on suppressing the amount of hydrogen intruding into the steel sheet for hot stamping 10 cannot be obtained. Therefore, the Ni content in the Ni plating layer 3 is more than 90 mass %. A preferable Ni content is 92 mass % or more. A more preferable Ni content is 93 mass % or more or 94 mass %. A still more preferable Ni content is 95 mass % or more, 98 mass % or more or 99 mass % or more. The remainder of the Ni plating layer 3 is not particularly limited as long as the Ni content is more than 90 mass %. Cr may be contained in the Ni plating layer 3, and the Ni/Cr ratio is preferably larger than 9, and this ratio is more preferably 15 or more or 30 or more. The Cr content in the Ni plating layer 3 is preferably 6.0 mass % or less and more preferably 4.0 mass % or less or 3.0 mass % or less. The Cr content in the Ni plating layer 3 is still more preferably 2.0 mass % or less.

The thickness of the Ni plating layer 3 is measured by alternately repeating Ar sputtering etching and X-ray photoelectron spectroscopy (XPS) measurement. Specifically, the steel sheet for hot stamping 10 is sputtering-etched by Ar sputtering (accelerating voltage: 20 kV, sputtering rate: 1.0 nm/min), and then XPS measurement is carried out. The Ar sputtering etching and the XPS measurement are alternately carried out, and these measurements are repeated until a peak with a bonding energy of the 2p orbit of Ni in the XPS measurement of 852.5 eV to 852.9 eV appears and then disappears. The layer thickness of the Ni plating layer 3 is calculated from the sputtering etching time and the sputtering etching rate from a position where the Ni content reaches 10 atomic % or more for the first time after the start of the sputtering to a position where the Ni content reaches less than 10 atomic %. The sputtering etching rate is obtained in terms of $SiO_2$. The thickness of the Ni plating layer 3 is the arithmetic average value of two measurement sites.

Regarding the Ni content in the Ni plating layer 3, the Ni content at the central position in the sheet thickness direction of the Ni plating layer 3 that is obtained in the measurement of the thickness of the Ni plating layer is regarded as the Ni content of the Ni plating layer.

(Thickness)

The thickness of the steel sheet for hot stamping 10 is not particularly limited and may be, for example, 0.4 mm or more. A more preferable thickness of the steel sheet is 0.8 mm or more, 1.0 mm or more or 1.2 mm or more. The thickness of steel for hot stamping may be 6.0 mm or less. A more preferable thickness of the steel sheet is 5.0 mm or less, 4.0 mm or less, 3.2 mm or less or 2.8 mm or less.

<Manufacturing Method of Steel Sheet for Hot Stamping>

Next, a preferable manufacturing method of the steel sheet for hot stamping 10 will be described. A slab that is to be subjected to hot rolling may be a slab manufactured by a normal method and may be, for example, a slab manufactured by an ordinary method such as a continuous cast slab or a thin slab caster.

In a case where the Nb content in the slab is less than 0.010%, it is not possible to sufficiently obtain a solid solution of Nb even when all Nb in the slab turns into the solid solution of Nb. Therefore, the Nb content in the slab is 0.010% or more. In a case where the Nb content in the slab is more than 0.200%, a carbide is coarsened. Therefore, the Nb content in the slab is 0.200% or less.

The slab is heated to 1200° C. or higher before hot rolling. In a case where the heating temperature of the slab is lower than 1200° C., a Nb carbide in the slab is not dissolved, and the amount of the solid solution of Nb decreases, which is not preferable. Therefore, the heating temperature of the slab is set to 1200° C. or higher.

Hot rolling after the heating of the slab may be carried out by an ordinary method and is not particularly limited.

After the hot rolling, the steel sheet is cooled to a temperature range of room temperature to 500° C. and coiled. When the coiling start temperature is higher than 500° C., the amount of the solid solution of Nb in the steel sheet for hot stamping 10 decreases, which is not preferable. Here, room temperature refers to a temperature region of 23° C. to 28° C. The cooling rate up to 500° C. after the rolling is preferably 30° C./second or faster.

The steel sheet is cooled to a temperature range of 500° C. or lower and then coiled. After the coiling, cold rolling may be further carried out as necessary. The cumulative rolling reduction in the cold rolling is not particularly limited, but is preferably set to 40% to 60% from the viewpoint of the shape stability of the steel sheet.

Among the manufacturing steps of the steel sheet for hot stamping, in steps after the coiling (from annealing before plating to coiling after plating), in a case where the total of times taken for the temperature of the steel sheet to reach 500° C. or higher (holding time at 500° C. or higher) is longer than 180 seconds, the amount of the solid solution of Nb in the steel sheet for hot stamping 10 becomes low. Therefore, the total of the times taken for the temperature of the steel sheet to reach 500° C. or higher (holding time at 500° C. or higher) is set to 180 seconds or shorter. Hereinafter, manufacturing conditions for setting the holding time at 500° C. or higher to 180 seconds or shorter will be described as an example, but the present invention is not limited to the following method.

Before Al—Si alloy plating is provided on the steel sheet, annealing before plating is carried out. Specifically, it is preferable that, after the coiling, the steel is heated up to a temperature range of 780° C. to 810° C. at a temperature rising rate of 10° C./second to 100° C./second and retained in the temperature range for 90 seconds to 110 seconds. In a case where the temperature rising rate is slower than 10° C./second, there is a case where the holding time at 500° C. or higher exceeds 180 seconds. Usual temperature rising rates during the annealing before plating are 3° C./second to 6° C./second, and there is a case where the holding time at 500° C. or higher exceeds 180 seconds. Therefore, the steel sheet is preferably heated rapidly by energization heating or the like in order to set the temperature rising rate to 10° C./second or faster.

After the end of the retention, the steel sheet is rapidly cooled to a temperature range of 660° C. to 680° C. at a cooling rate of 12° C./second to 20° C./second (cooling before plating). In a case where the cooling rate is slower than 12° C./second, there is a case where the holding time at 500° C. or higher becomes longer than 180 seconds.

"Al—Si alloy plating" Al—Si alloy plating is provided on the steel sheet. A method for forming the Al—Si alloy plating layer 2 is not particularly limited, and a hot-dip plating method, an electroplating method, a vacuum deposition method, a cladding method, a thermal spraying method or the like can be used. The hot-dip plating method is particularly preferable. In the case of the hot-dip plating method, hot-dip plating is carried out after the cooling before plating.

In a case where the Al—Si alloy plating layer 2 is formed by the hot-dip plating method, the base material 1 is immersed in a plating bath where the components have been adjusted such that at least the Si content reaches 3 mass % or more and the total of the Al content and the Si content reaches 95 mass % or more, thereby obtaining the Al—Si alloy-plated steel sheet. In this case, the Al—Si alloy plating layer 2 turns into a molten Al—Si alloy plating layer. The temperature of the plating bath is preferably within a temperature range of 660° C. to 680° C. After the hot-dip plating, the steel sheet is preferably cooled to 500° C. or lower at 15° C./second to 40° C./second (cooling after plating). In a case where the cooling rate is slower than 15° C./second, there is a case where the holding time at 500° C. or exceeds 180 seconds. Usually, the cooling rate after the hot-dip plating is 8° C./second to 12° C./second, the steel sheet is preferably cooled by mist cooling or the like in order to set the cooling rate to 15° C./second or faster.

In addition, in a case where hot-dip plating is carried out, there is a case where Fe is incorporated into the plating bath as an impurity other than Al or Si. In addition, Ni. Mg, Ti, Zn, Sb. Sn, Cu, Co, In, Bi. Ca, mischmetal, and the like may be further contained in the plating bath as long as the Si content reaches 3 mass % or more and the total of the Al content and the Si content reaches 95 mass % or more.

"Ni Plating"

The steel sheet for hot stamping is obtained by providing Ni plating on the Al—Si alloy-plated steel sheet to form a Ni plating layer 3. The Ni plating layer 3 may be formed by an electro plating method, a vacuum deposition method or the like. Before the Ni plating is provided, an oxide film on the Al—Si alloy plating layer 2 may be removed.

In a case where the Ni plating layer 3 is formed by electro plating, the Al—Si alloy-plated steel sheet is immersed in a plating bath containing nickel sulfate, nickel chloride and boric acid and the current density and the energization time are controlled as appropriate using soluble Ni as an anode, whereby the Ni plating layer 3 can be formed such that the thickness reaches more than 200 nm.

In a case where the plating original sheet is a cold-rolled steel sheet or the like, temper rolling may be carried out at a cumulative rolling reduction of approximately 0.5% to 2% after the Ni plating).

<Hot Stamping Step>

A hot-stamping formed body is obtained by hot-stamping the steel sheet for hot stamping manufactured above. Hereinafter, conditions for the hot stamping will be described as an example, but the hot stamping conditions are not limited to these conditions.

It is preferable that the steel sheet for hot stamping is put into a heating furnace and heated up to a temperature of the $Ac_3$ point or higher (Target temperature) at a heating speed of 2.0° C./second to 10.0° C./second. When the heating temperature is 2.0° C./second to 10.0° C./second, it is possible to prevent the surface diffusion of Fe, which is preferable. When the Target temperature is the $Ac_3$ point or higher, it is possible to suppress spring back, which is preferable. The $Ac_3$ point (° C.) is represented by the following formula (1).

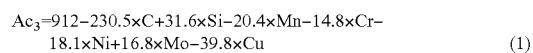

$$Ac_3 = 912 - 230.5 \times C + 31.6 \times Si - 20.4 \times Mn - 14.8 \times Cr - 18.1 \times Ni + 16.8 \times Mo - 39.8 \times Cu \quad (1)$$

Element symbols in the formula indicate the amounts by mass % of the corresponding elements, and zero is assigned in a case where an element is not contained.

The retention time after the Target temperature is reached is preferably set to 5 seconds or longer and 300 seconds or shorter. When the retention time is 5 seconds or longer and 300 seconds or shorter, it is possible to suppress the diffusion of Fe to the hot-stamping formed body, which is preferable.

The steel sheet after the retention is hot-stamped and cooled down to room temperature to obtain a hot-stamping formed body. The cooling rate up to room temperature after the hot stamping is preferably 5° C./second or faster. When the cooling rate is 5° C./second or faster, it is possible to suppress the diffusion of Fe to the surface of the hot-stamping formed body.

The holding time in a temperature range of 450° C. or higher (a time during which the steel sheet resides at 450° C. or higher while being heated, retained and cooled) is preferably 7.0 minutes or shorter. The holding time is more preferably 3.5 minutes or shorter and still more preferably 2.1 minutes or shorter. In a case where the holding time in the temperature range of 450° C. or higher is longer than 7.0 minutes, there is a case where Fe diffuses up to the surface of the hot-stamping formed body, which is not preferable.

(Tensile Strength)

There is no need to particularly regulate the tensile strength of the hot-stamping formed body, and the tensile strength may be set to 1200 MPa or more. As necessary, the lower limit of the tensile strength may be set to 1300 MPa, 1400 MPa, 1500 MPa, 1550 MPa, 1600 MPa, 1650 MPa, 1700 MPa, 1750 MPa or 1800 MPa, and the upper limit may be set to 2500 MPa, 2400 MPa, 2300 MPa or 2220 MPa.

EXAMPLES

Next, examples of the present invention will be described. Conditions in the examples are examples of conditions adopted to confirm the feasibility and effect of the present invention, and the present invention is not limited to the examples of conditions. The present invention is capable of adopting a variety of conditions as long as the objective of the present invention is achieved without departing from the gist of the present invention.

(Manufacturing of Steel Sheet)

Slabs manufactured by casting molten steel having a chemical composition shown in Table 1A and Table 1B were heated under temperature conditions shown in Table 2A and Table 2B, then, hot-rolled, cooled under cooling conditions shown in Table 2A and Table 2B and coiled at coiling start temperature shown in Table 2A and Table 2B, thereby obtaining hot-rolled steel sheets (steel sheets). In Test Nos. 66 to 80, the slabs were cold-rolled to a thickness of 1.6 mm from 3.2 mm after the hot rolling, thereby obtaining cold-rolled steel sheets. The other steel sheets were rolled to a thickness of 1.6 mm by hot rolling.

TABLE 1A

| Steel No. | Chemical composition (mass %), remainder: Fe and impurity | | | | | | | | | | | |
|---|---|---|---|---|---|---|---|---|---|---|---|---|
| | C | Si | Mn | P | S | sol. Al | N | Nb | Cu | Ni | V | Ti |
| 1 | 0.23 | 0.254 | 1.21 | 0.010 | 0.0009 | 0.03200 | 0.0039 | 0.012 | | | | 0.026 |
| 2 | 0.01 | 0.112 | 0.42 | 0.010 | 0.0061 | 0.03110 | 0.0036 | 0.095 | | | | |
| 3 | 0.08 | 0.201 | 1.56 | 0.009 | 0.0012 | 0.02960 | 0.0030 | 0.076 | | | | |
| 4 | 0.21 | 0.197 | 1.18 | 0.007 | 0.0006 | 0.01278 | 0.0026 | 0.100 | | | | |
| 5 | 0.25 | 0.194 | 1.27 | 0.006 | 0.0044 | 0.03891 | 0.0034 | 0.099 | | | | |
| 6 | 0.31 | 0.197 | 1.67 | 0.007 | 0.0041 | 0.03808 | 0.0025 | 0.067 | | | | |
| 7 | 0.35 | 0.198 | 1.42 | 0.007 | 0.0004 | 0.02470 | 0.0045 | 0.061 | | | | |
| 8 | 0.45 | 0.216 | 1.73 | 0.008 | 0.0030 | 0.03330 | 0.0025 | 0.031 | | | | |
| 9 | 0.65 | 0.230 | 1.32 | 0.009 | 0.0034 | 0.01829 | 0.0022 | 0.033 | | | | |
| 10 | 0.29 | 0.176 | 1.67 | 0.006 | 0.0030 | 0.04945 | 0.0032 | 0.079 | | | | |
| 11 | 0.31 | 0.130 | 1.98 | 0.006 | 0.0022 | 0.02795 | 0.0032 | 0.043 | | | | |
| 12 | 0.36 | 0.189 | 1.88 | 0.008 | 0.0016 | 0.04619 | 0.0024 | 0.035 | | | | |
| 13 | 0.04 | 0.016 | 0.16 | 0.007 | 0.0045 | 0.04841 | 0.0017 | 0.060 | | | | |
| 14 | 0.45 | 0.201 | 0.42 | 0.005 | 0.0041 | 0.01086 | 0.0037 | 0.070 | | | | |
| 15 | 0.36 | 0.223 | 0.78 | 0.010 | 0.0007 | 0.02867 | 0.0044 | 0.072 | | | | |
| 16 | 0.32 | 0.190 | 1.31 | 0.006 | 0.0022 | 0.04411 | 0.0050 | 0.092 | | | | |
| 17 | 0.30 | 0.216 | 1.76 | 0.010 | 0.0012 | 0.02610 | 0.0015 | 0.062 | | | | |
| 18 | 0.35 | 0.191 | 2.41 | 0.006 | 0.0048 | 0.02509 | 0.0040 | 0.065 | | | | |
| 19 | 0.28 | 0.201 | 2.88 | 0.007 | 0.0025 | 0.03602 | 0.0038 | 0.051 | | | | |
| 20 | 0.36 | 0.219 | 0.97 | 0.005 | 0.0018 | 0.02210 | 0.0021 | 0.008 | | | | |
| 21 | 0.24 | 0.184 | 1.30 | 0.008 | 0.0035 | 0.03121 | 0.0041 | 0.012 | | | | |
| 22 | 0.29 | 0.213 | 1.98 | 0.010 | 0.0046 | 0.01365 | 0.0024 | 0.038 | | | | |
| 23 | 0.31 | 0.214 | 1.28 | 0.009 | 0.0012 | 0.03927 | 0.0047 | 0.078 | | | | |
| 24 | 0.08 | 0.193 | 1.56 | 0.008 | 0.0046 | 0.02263 | 0.0018 | 0.142 | | | | |

| Steel No. | Chemical composition (mass %), remainder: Fe and impurity | | | | | $Ac_3$ point (° C.) | Note |
|---|---|---|---|---|---|---|---|
| | Mo | Cr | B | Ca | REM | | |
| 1 | 0.002 | 0.211 | 0.0020 | | | 839 | Present Invention Steel |
| 2 | | | | | | 905 | Present Invention Steel |
| 3 | | | | | | 868 | Present Invention Steel |
| 4 | | | | | | 846 | Present Invention Steel |
| 5 | | | | | | 835 | Present Invention Steel |
| 6 | | | | | | 813 | Present Invention Steel |
| 7 | | | | | | 809 | Present Invention Steel |
| 8 | | | | | | 780 | Present Invention Steel |
| 9 | | | | | | 743 | Present Invention Steel |
| 10 | | | | | | 817 | Present Invention Steel |
| 11 | | | | | | 804 | Present Invention Steel |
| 12 | | | | | | 797 | Present Invention Steel |
| 13 | | | | | | 900 | Comparative Steel |
| 14 | | | | | | 806 | Present Invention Steel |
| 15 | | | | | | 820 | Present Invention Steel |
| 16 | | | | | | 818 | Present Invention Steel |
| 17 | | | | | | 814 | Present Invention Steel |
| 18 | | | | | | 788 | Present Invention Steel |
| 19 | | | | | | 795 | Present Invention Steel |
| 20 | | | | | | 816 | Comparative Steel |
| 21 | | | | | | 836 | Present Invention Steel |
| 22 | | | | | | 811 | Present Invention Steel |
| 23 | | | | | | 821 | Present Invention Steel |
| 24 | | | | | | 868 | Present Invention Steel |

Underlines indicate that the corresponding values are outside the scope of the present invention.

TABLE 1B

| Steel No. | Chemical composition (mass %), remainder: Fe and impurity | | | | | | | | | | | |
|---|---|---|---|---|---|---|---|---|---|---|---|---|
| | C | Si | Mn | P | S | sol. Al | N | Nb | Cu | Ni | V | Ti |
| 25 | 0.29 | 0.212 | 0.90 | 0.005 | 0.0040 | 0.04864 | 0.0043 | 0.085 | | | | |
| 26 | 0.30 | 0.218 | 1.65 | 0.095 | 0.0009 | 0.01105 | 0.0047 | 0.071 | | | | |
| 27 | 0.31 | 0.199 | 1.89 | 0.005 | 0.0003 | 0.03334 | 0.0019 | 0.040 | | | | |
| 28 | 0.35 | 0.229 | 1.13 | 0.005 | 0.0036 | 0.01883 | 0.0027 | 0.098 | | | | |
| 29 | 0.35 | 0.220 | 1.51 | 0.009 | 0.0946 | 0.01462 | 0.0043 | 0.077 | | | | |
| 30 | 0.28 | 0.216 | 1.14 | 0.005 | 0.0008 | 0.00030 | 0.0031 | 0.053 | | | | |
| 31 | 0.30 | 0.209 | 1.38 | 0.007 | 0.0041 | 0.03100 | 0.0024 | 0.030 | | | | |
| 32 | 0.29 | 0.226 | 1.66 | 0.010 | 0.0048 | 0.46100 | 0.0024 | 0.049 | | | | |
| 33 | 0.31 | 0.221 | 1.24 | 0.009 | 0.0010 | 0.03734 | 0.0078 | 0.066 | | | | |
| 34 | 0.35 | 0.212 | 0.83 | 0.010 | 0.0002 | 0.03580 | 0.0091 | 0.038 | | | | |

TABLE 1B-continued

| Steel No. | C | Si | Mn | P | S | sol. Al | N | Nb | Cu | Ni | V | Ti | Mo | Cr | B | Ca | REM | $Ac_3$ point (° C.) | Note |
|---|---|---|---|---|---|---|---|---|---|---|---|---|---|---|---|---|---|---|---|
| 25 | | | | | | | | | | | | | | | | | | 833 | Present Invention Steel |
| 26 | | | | | | | | | | | | | | | | | | 816 | Present Invention Steel |
| 27 | | | | | | | | | | | | | | | | | | 808 | Present Invention Steel |
| 28 | | | | | | | | | | | | | | | | | | 816 | Present Invention Steel |
| 29 | | | | | | | | | | | | | | | | | | 807 | Present Invention Steel |
| 30 | | | | | | | | | | | | | | | | | | 831 | Present Invention Steel |
| 31 | | | | | | | | | | | | | | | | | | 821 | Present Invention Steel |
| 32 | | | | | | | | | | | | | | | | | | 818 | Present Invention Steel |
| 33 | | | | | | | | | | | | | | | | | | 822 | Present Invention Steel |
| 34 | | | | | | | | | | | | | | | | | | 821 | Present Invention Steel |
| 35 | 0.36 | 0.224 | 1.74 | 0.009 | 0.0004 | 0.02299 | 0.0040 | 0.099 | | | | 0.011 | | | | | | 801 | Present Invention Steel |
| 36 | 0.32 | 0.200 | 1.09 | 0.007 | 0.0011 | 0.03013 | 0.0027 | 0.031 | | | | 0.026 | | | | | | 822 | Present Invention Steel |
| 37 | 0.35 | 0.194 | 0.93 | 0.009 | 0.0014 | 0.01834 | 0.0029 | 0.065 | | | | 0.141 | | | | | | 818 | Present Invention Steel |
| 38 | 0.33 | 0.223 | 1.36 | 0.010 | 0.0007 | 0.01077 | 0.0026 | 0.096 | | | | | 0.005 | | | | | 815 | Present Invention Steel |
| 39 | 0.33 | 0.194 | 1.11 | 0.006 | 0.0033 | 0.03567 | 0.0021 | 0.094 | | | | | 0.010 | | | | | 820 | Present Invention Steel |
| 40 | 0.32 | 0.192 | 1.53 | 0.006 | 0.0023 | 0.01660 | 0.0034 | 0.078 | | | | | 0.984 | | | | | 830 | Present Invention Steel |
| 41 | 0.36 | 0.196 | 1.85 | 0.010 | 0.0050 | 0.01301 | 0.0031 | 0.075 | | | | | | 0.012 | | | | 797 | Present Invention Steel |
| 42 | 0.36 | 0.200 | 1.93 | 0.005 | 0.0016 | 0.03784 | 0.0016 | 0.056 | | | | | | 0.208 | | | | 793 | Present Invention Steel |
| 43 | 0.31 | 0.191 | 1.64 | 0.008 | 0.0007 | 0.01268 | 0.0019 | 0.084 | | | | | | 0.989 | | | | 798 | Present Invention Steel |
| 44 | 0.36 | 0.204 | 1.79 | 0.009 | 0.0037 | 0.04722 | 0.0041 | 0.046 | | | | | | | 0.0005 | | | 799 | Present Invention Steel |
| 45 | 0.31 | 0.206 | 1.31 | 0.005 | 0.0050 | 0.03133 | 0.0023 | 0.063 | | | | | | | 0.0021 | | | 820 | Present Invention Steel |
| 46 | 0.32 | 0.230 | 1.81 | 0.007 | 0.0026 | 0.01163 | 0.0037 | 0.086 | | | | | | | 0.0088 | | | 809 | Present Invention Steel |
| 47 | 0.33 | 0.205 | 1.59 | 0.006 | 0.0019 | 0.03027 | 0.0024 | 0.100 | | | | | | | | 0.009 | | 810 | Present Invention Steel |
| 48 | 0.33 | 0.218 | 1.37 | 0.010 | 0.0021 | 0.04957 | 0.0018 | 0.033 | | | | | | | | | 0.270 | 815 | Present Invention Steel |
| 49 | 0.27 | 0.600 | 0.85 | 0.010 | 0.0020 | 0.01200 | 0.0050 | 0.052 | 0.26 | 0.13 | | 0.030 | 0.300 | 0.0020 | | | | 844 | Present Invention Steel |
| 50 | 0.55 | 0.280 | 0.41 | 0.005 | 0.0004 | 0.01100 | 0.0030 | 0.033 | 0.30 | 0.10 | | 0.027 | 0.200 | 0.0023 | | | | 775 | Present Invention Steel |
| 51 | 0.30 | 0.470 | 0.65 | 0.010 | 0.0017 | 0.01300 | 0.0040 | 0.041 | 0.18 | 0.09 | | 0.040 | 0.220 | 0.0022 | | | | 839 | Present Invention Steel |
| 52 | 0.42 | 0.370 | 0.56 | 0.010 | 0.0014 | 0.01100 | 0.0040 | 0.050 | 0.90 | 0.18 | 0.15 | 0.038 | 0.240 | 0.0021 | | | | 780 | Present Invention Steel |
| 53 | 0.22 | 0.196 | 1.19 | 0.007 | 0.0006 | 0.01272 | 0.0025 | 0.035 | 0.16 | 0.08 | | | | | | | | 835 | Present Invention Steel |
| 54 | 0.21 | 0.197 | 1.18 | 0.006 | 0.0006 | 0.01274 | 0.0026 | 0.042 | 0.01 | | | | | | | | | 845 | Present Invention Steel |
| 55 | 0.21 | 0.195 | 1.20 | 0.007 | 0.0005 | 0.01278 | 0.0022 | 0.045 | | 0.01 | | | | | | | | 845 | Present Invention Steel |
| 56 | 0.20 | 0.199 | 1.17 | 0.008 | 0.0004 | 0.01275 | 0.0026 | 0.051 | | | 0.09 | | | | | | | 848 | Present Invention Steel |

TABLE 2A

| | | Rolling | | | | Plating | | | |
| | | Heating | Cooling | | Coiling | Al-Si alloy plating layer | | | |
| Steel sheet No. | Steel No. | Heating temperature (° C.) | Cooling start temperature (° C.) | Cooling rate (° C./second) | Coiling start temperature ° C. | Al content (mass %) | Si content (mass %) | Thickness (μm) | Holding time at 500° C. or higher (s) |
|---|---|---|---|---|---|---|---|---|---|
| 1 | 1 | 1218 | 1010 | 59 | 460 | 93 | 5 | 21 | 174 |
| 2 | 2 | 1338 | 1038 | 93 | 458 | 93 | 4 | 25 | 170 |
| 3 | 3 | 1262 | 1110 | 65 | 447 | 88 | 9 | 22 | 168 |
| 4 | 4 | 1237 | 1009 | 108 | 401 | 93 | 5 | 28 | 165 |
| 5 | 5 | 1317 | 998 | 89 | 476 | 88 | 10 | 19 | 171 |
| 6 | 6 | 1312 | 987 | 55 | 499 | 88 | 9 | 22 | 161 |
| 7 | 7 | 1329 | 930 | 97 | 496 | 88 | 11 | 17 | 158 |
| 8 | 8 | 1239 | 899 | 70 | 465 | 93 | 4 | 16 | 156 |
| 9 | 9 | 1245 | 966 | 103 | 464. | 91 | 7 | 33 | 168 |
| 10 | 10 | 1271 | 962 | 61 | 487 | 90 | 7 | 17 | 169 |
| 11 | 11 | 1289 | 972 | 115 | 460 | 88 | 10 | 25 | 172 |
| 12 | 12 | 1347 | 951 | 114 | 476 | 87 | 11 | 29 | 174 |
| 13 | 13 | 1245 | 1046 | 78 | 455 | 87 | 10 | 21 | 175 |
| 14 | 14 | 1226 | 994 | 63 | 402 | 92 | 6 | 31 | 178 |
| 15 | 15 | 1219 | 927 | 112 | 435 | 92 | 7 | 29 | 171 |
| 16 | 16 | 1264 | 933 | 105 | 435 | 90 | 9 | 35 | 169 |
| 17 | 17 | 1323 | 937 | 82 | 414 | 90 | 9 | 34 | 168 |
| 18 | 18 | 1301 | 1005 | 94 | 400 | 90 | 7 | 21 | 167 |
| 19 | 19 | 1236 | 1011 | 54 | 410 | 91 | 7 | 26 | 168 |
| 20 | 20 | 1333 | 1019 | 106 | 465 | 88 | 11 | 16 | 169 |
| 21 | 21 | 1287 | 1024 | 98 | 476 | 88 | 9 | 15 | 157 |
| 22 | 22 | 1346 | 1035 | 94 | 492 | 93 | 6 | 22 | 159 |
| 23 | 23 | 1339 | 985 | 79 | 437 | 91 | 6 | 24 | 172 |
| 24 | 24 | 1253 | 1042 | 74 | 484 | 88 | 9 | 23 | 163 |
| 25 | 25 | 1229 | 1010 | 60 | 405 | 90 | 9 | 25 | 160 |
| 26 | 26 | 1253 | 1019 | 95 | 463 | 88 | 10 | 25 | 158 |
| 27 | 27 | 1313 | 1004 | 117 | 483 | 93 | 4 | 26 | 159 |
| 28 | 28 | 1279 | 1062 | 61 | 427 | 93 | 6 | 30 | 164 |
| 29 | 29 | 1272 | 964 | 120 | 435 | 93 | 6 | 31 | 168 |
| 30 | 30 | 1324 | 1035 | 76 | 461 | 88 | 10 | 31 | 163 |
| 31 | 31 | 1348 | 953 | 108 | 458 | 92 | 6 | 17 | 160 |
| 32 | 32 | 1264 | 943 | 57 | 497 | 89 | 10 | 35 | 169 |

| | Plating | | | |
| | Ni plating layer | | | |
| Steel sheet No. | Plating method | Ni content (mass %) | Thickness (nm) | Note |
|---|---|---|---|---|
| 1 | Electro plating | 75 | 210 | Comparative Example |
| 2 | Electro plating | 98 | 699 | Present Invention Example |
| 3 | Electro plating | 96 | 630 | Present Invention Example |
| 4 | Electro plating | 97 | 675 | Present Invention Example |
| 5 | Electro plating | 98 | 594 | Present Invention Example |
| 6 | Electro plating | 99 | 597 | Present Invention Example |
| 7 | Electro plating | 96 | 630 | Present Invention Example |
| 8 | Electro plating | 97 | 642 | Present Invention Example |
| 9 | Electro plating | 96 | 631 | Present Invention Example |
| 10 | Electro plating | 95 | 617 | Present Invention Example |
| 11 | Electro plating | 98 | 666 | Present Invention Example |
| 12 | Electro plating | 96 | 647 | Present Invention Example |
| 13 | Electro plating | 99 | 220 | Comparative Example |
| 14 | Electro plating | 98 | 668 | Present InventionExample |
| 15 | Electro plating | 98 | 617 | Present Invention Example |
| 16 | Electro plating | 99 | 511 | Present Invention Example |
| 17 | Electro plating | 98 | 591 | Present Invention Example |
| 18 | Electro plating | 96 | 591 | Present Invention Example |
| 19 | Electro plating | 95 | 503 | Present Invention Example |
| 20 | Electro plating | 98 | 210 | Comparative Example |
| 21 | Electro plating | 99 | 664 | Present Invention Example |
| 22 | Electro plating | 95 | 693 | Present Invention Example |
| 23 | Electro plating | 99 | 729 | Present Invention Example |
| 24 | Electro plating | 97 | 698 | Present Invention Example |
| 25 | Electro plating | 99 | 624 | Present Invention Example |
| 26 | Electro plating | 97 | 667 | Present Invention Example |
| 27 | Electro plating | 97 | 551 | Present Invention Example |

TABLE 2A-continued

| | | | | |
|---|---|---|---|---|
| 28 | Electro plating | 96 | 520 | Present Invention Example |
| 29 | Electro plating | 95 | 690 | Present Invention Example |
| 30 | Electro plating | 99 | 573 | Present Invention Example |
| 31 | Electro plating | 98 | 691 | Present Invention Example |
| 32 | Electro plating | 95 | 728 | Present Invention Example |

Underlines indicate that the corresponding values are outside the scope of the present invention.

TABLE 2B

| | | Rolling | | | | Plating | | | |
|---|---|---|---|---|---|---|---|---|---|
| | | Heating | Cooling | | Coiling | Al-Si alloy plating layer | | | |
| Steel sheet No. | Steel No. | Heating temperature (° C.) | Cooling start temperature (° C.) | Cooling rate (° C./second) | Coiling start temperature (° C.) | Al content (mass %) | Si content (mass %) | Thickness (μm) | Holding time at 500° C. or higher (s) |
| 33 | 33 | 1295 | 941 | 91 | 439 | 93 | 4 | 34 | 158 |
| 34 | 34 | 1208 | 944 | 52 | 433 | 89 | 8 | 36 | 161 |
| 35 | 35 | 1226 | 1027 | 51 | 468 | 93 | 4 | 22 | 172 |
| 36 | 36 | 1219 | 928 | 120 | 472 | 90 | 9 | 35 | 165 |
| 37 | 37 | 1343 | 931 | 110 | 461 | 91 | 7 | 30 | 164 |
| 38 | 38 | 1311 | 948 | 97 | 404 | 88 | 11 | 27 | 169 |
| 39 | 39 | 1307 | 960 | 106 | 448 | 93 | 5 | 35 | 170 |
| 40 | 40 | 1248 | 981 | 76 | 439 | 87 | 10 | 26 | 173 |
| 41 | 41 | 1249 | 1036 | 79 | 492 | 88 | 9 | 28 | 162 |
| 42 | 42 | 1289 | 945 | 103 | 441 | 92 | 7 | 17 | 158 |
| 43 | 43 | 1224 | 1028 | 50 | 414 | 87 | 10 | 20 | 166 |
| 44 | 44 | 1211 | 907 | 81 | 410 | 87 | 10 | 35 | 165 |
| 45 | 45 | 1315 | 957 | 57 | 400 | 87 | 10 | 33 | 166 |
| 46 | 46 | 1266 | 997 | 116 | 437 | 89 | 8 | 17 | 168 |
| 47 | 47 | 1220 | 959 | 102 | 487 | 93 | 4 | 17 | 167 |
| 48 | 48 | 1263 | 982 | 65 | 405 | 92 | 7 | 22 | 167 |
| 50 | 4 | <u>1186</u> | 968 | 89 | 413 | 88 | 9 | 17 | 161 |
| 51 | 4 | 1206 | 959 | 93 | 429 | 92 | 6 | 16 | 162 |
| 52 | 4 | 1294 | 957 | 63 | <u>526</u> | 87 | 11 | 35 | 159 |
| 53 | 4 | 1293 | 1064 | 117 | <u>481</u> | 93 | 4 | 20 | 164 |
| 54 | 4 | 1221 | 1039 | 52 | 420 | 93 | 4 | 34 | 163 |
| 55 | 4 | 1248 | 901 | 68 | 437 | 97 | 1 | 32 | 165 |
| 56 | 4 | 1302 | 1030 | 60 | 448 | 90 | 8 | 33 | 167 |
| 57 | 4 | 1208 | 955 | 109 | 420 | 92 | 6 | 21 | 164 |
| 58 | 4 | 1256 | 978 | 121 | 436 | 76 | <u>23</u> | 27 | 165 |
| 59 | 4 | 1333 | 956 | 67 | 405 | 90 | 8 | 35 | 171 |
| 60 | 4 | 1297 | 955 | 119 | 416 | 91 | 6 | 6 | 167 |
| 61 | 4 | 1303 | 1018 | 114 | 436 | 88 | 10 | 29 | 165 |
| 62 | 4 | 1235 | 1020 | 89 | 409 | 92 | 6 | 30 | 166 |
| 63 | 4 | 1227 | 1028 | 61 | 429 | 90 | 8 | 17 | 165 |
| 64 | 4 | 1321 | 948 | 114 | 432 | 92 | 5 | 18 | 164 |
| 65 | 4 | 1210 | 973 | 77 | 421 | 87 | 12 | 19 | 164 |
| 66 | 49 | 1248 | 947 | 104 | 406 | 92 | 8 | 42 | 162 |
| 67 | 50 | 1259 | 952 | 92 | 421 | 93 | 7 | 33 | 173 |
| 68 | 51 | 1247 | 954 | 87 | 409 | 92 | 8 | 34 | 174 |
| 69 | 52 | 1243 | 949 | 101 | 422 | 93 | 7 | 32 | 153 |
| 70 | 53 | 1253 | 962 | 98 | 418 | 93 | 7 | 27 | 161 |
| 71 | 54 | 1240 | 957 | 94 | 406 | 93 | 7 | 38 | 175 |
| 72 | 55 | 1262 | 946 | 104 | 428 | 93 | 7 | 22 | 151 |
| 73 | 56 | 1281 | 971 | 107 | 423 | 91 | 9 | 42 | 166 |
| 74 | 4 | 1237 | 1009 | 108 | 401 | 92 | 8 | 32 | 178 |
| 75 | 4 | 1237 | 1009 | 108 | 401 | 92 | 8 | 33 | 172 |
| 76 | 4 | 1237 | 1009 | 108 | 401 | 93 | 5 | 28 | 165 |
| 77 | 17 | 1323 | 937 | 82 | 414 | 91 | 9 | 31 | 162 |
| 78 | 21 | 1330 | 1020 | 104 | 460 | 92 | 8 | 31 | 245 |
| 79 | 21 | 1330 | 1020 | 104 | 460 | 92 | 8 | 30 | <u>205</u> |
| 80 | 21 | 1330 | 1020 | 104 | 460 | 92 | 8 | 31 | 179 |

| | Plating Ni plating layer | | | |
|---|---|---|---|---|
| Steel sheet No. | Plating method | Ni content (mass %) | Thickness (nm) | Note |
| 33 | Electro plating | 96 | 513 | Present Invention Example |
| 34 | Electro plating | 96 | 544 | Present Invention Example |
| 35 | Electro plating | 97 | 670 | Present Invention Example |
| 36 | Electro plating | 99 | 667 | Present Invention Example |

TABLE 2B-continued

| | | | | |
|---|---|---|---|---|
| 37 | Electro plating | 97 | 690 | Present Invention Example |
| 38 | Electro plating | 99 | 679 | Present Invention Example |
| 39 | Electro plating | 98 | 628 | Present Invention Example |
| 40 | Electro plating | 98 | 581 | Present Invention Example |
| 41 | Electro plating | 98 | 702 | Present Invention Example |
| 42 | Electro plating | 97 | 550 | Present Invention Example |
| 43 | Electro plating | 99 | 504 | Present Invention Example |
| 44 | Electro plating | 99 | 633 | Present Invention Example |
| 45 | Electro plating | 99 | 722 | Present Invention Example |
| 46 | Electro plating | 99 | 500 | Present Invention Example |
| 47 | Electro plating | 95 | 599 | Present Invention Example |
| 48 | Deposition | 99 | 511 | Present Invention Example |
| 50 | Electro plating | 99 | 230 | Comparative Example |
| 51 | Electro plating | 99 | 521 | Present Invention Example |
| 52 | Electro plating | 96 | 240 | Comparative Example |
| 53 | Electro plating | 96 | 602 | Present Invention Example |
| 54 | Electro plating | 98 | 537 | Present Invention Example |
| 55 | Electro plating | 99 | 541 | Comparative Example |
| 56 | Electro plating | 98 | 685 | Present Invention Example |
| 57 | Electro plating | 97 | 702 | Present Invention Example |
| 58 | Electro plating | 99 | 400 | Comparative Example |
| 59 | Electro plating | 98 | 517 | Present Invention Example |
| 60 | Electro plating | 98 | 537 | Comparative Example |
| 61 | Electro plating | 91 | 564 | Present Invention Example |
| 62 | Electro plating | <u>85</u> | 220 | Comparative Example |
| 63 | None | <u>0</u> | 0 | Comparative Example |
| 64 | Electro plating | 99 | <u>184</u> | Comparative Example |
| 65 | Electro plating | 96 | 651 | Present Invention Example |
| 66 | Electro plating | 99 | 1203 | Present Invention Example |
| 67 | Electro plating | 99 | 908 | Present Invention Example |
| 68 | Electro plating | 99 | 1020 | Present Invention Example |
| 69 | Electro plating | 99 | 1527 | Present Invention Example |
| 70 | Electro plating | 99 | 650 | Present Invention Example |
| 71 | Electro plating | 99 | 982 | Present Invention Example |
| 72 | Electro plating | 98 | 1150 | Present Invention Example |
| 73 | Electro plating | 96 | 2191 | Present Invention Example |
| 74 | Deposition | 90 | 562 | Comparative Example |
| 75 | Deposition | <u>93</u> | 574 | Present Invention Example |
| 76 | Electro plating | 99 | 992 | Present Invention Example |
| 77 | Electro plating | 99 | 1054 | Present Invention Example |
| 78 | Electro plating | 99 | 562 | Comparative Example |
| 79 | Electro plating | 99 | 552 | Comparative Example |
| 80 | Electro plating | 99 | 571 | Present Invention |

Underlines indicate that the corresponding values are outside the scope of the present invention.

TABLE 3A

| Steel sheet | | | Hot stamping step | | | | Property | |
|---|---|---|---|---|---|---|---|---|
| | | Amount of | Heating | | | Post treatment | Corrosion resistance | |
| Steel sheet No. | Steel No. | solid solution of Nb (mass %) | Heating rate (° C./second) | Target temp- erature (° C.) | Retention time (seconds) | Tempering temp- erature (° C.) | Evaluation of metallic gloss | Note |
| 1 | 1 | 0.012 | 4.8 | 915 | 97 | — | Bad | Comparative Example |
| 2 | 2 | 0.045 | 5.9 | 919 | 78 | — | excellent | Present Invention Example |
| 3 | 3 | 0.029 | 3.8 | 893 | 118 | — | great | Present Invention Example |
| 4 | 4 | 0.033 | 4.1 | 888 | 71 | — | excellent | Present Invention Example |
| 5 | 5 | 0.034 | 2.8 | 890 | 119 | — | excellent | Present Invention Example |
| 6 | 6 | 0.025 | 4.3 | 879 | 67 | — | great | Present Invention Example |
| 7 | 7 | 0.031 | 5.9 | 891 | 61 | — | excellent | Present Invention Example |
| 8 | 8 | 0.020 | 2.6 | 890 | 95 | — | great | Present Invention Example |
| 9 | 9 | 0.022 | 5.7 | 898 | 113 | 250 | great | Present Invention Example |
| 10 | 10 | 0.021 | 3.0 | 863 | 65 | — | great | Present Invention Example |
| 11 | 11 | 0.031 | 2.7 | 917 | 60 | — | excellent | Present Invention Example |
| 12 | 12 | 0.034 | 4.1 | 891 | 64 | — | excellent | Present Invention Example |
| 13 | <u>13</u> | <u>0.005</u> | 5.9 | 908 | 60 | — | bad | Comparative Example |
| 14 | <u>14</u> | <u>0.029</u> | 4.4 | 864 | 70 | — | great | Present Invention Example |
| 15 | 15 | 0.022 | 3.8 | 883 | 108 | — | great | Present Invention Example |
| 16 | 16 | 0.031 | 2.6 | 903 | 105 | — | excellent | Present Invention Example |
| 17 | 17 | 0.054 | 5.3 | 909 | 98 | — | magnificent | Present Invention Example |
| 18 | 18 | 0.053 | 3.1 | 905 | 105 | — | magnificent | Present Invention Example |
| 19 | 19 | 0.030 | 2.0 | 878 | 77 | — | excellent | Present Invention Example |
| 20 | <u>20</u> | <u>0.008</u> | 3.4 | 861 | 95 | — | bad | Comparative Example |
| 21 | <u>21</u> | <u>0.012</u> | 4.9 | 910 | 95 | — | great | Present Invention Example |
| 22 | 22 | 0.036 | 5.6 | 863 | 113 | — | excellent | Present Invention Example |

TABLE 3A-continued

| Steel sheet No. | Steel No. | Amount of solid solution of Nb (mass %) | Heating rate (° C./second) | Target temperature (° C.) | Retention time (seconds) | Tempering temperature (° C.) | Evaluation of metallic gloss | Note |
|---|---|---|---|---|---|---|---|---|
| 23 | 23 | 0.053 | 5.2 | 902 | 119 | — | magnificent | Present Invention Example |
| 24 | 24 | 0.019 | 3.9 | 897 | 66 | — | great | Present Invention Example |
| 25 | 25 | 0.030 | 5.9 | 873 | 63 | — | great | Present Invention Example |
| 26 | 26 | 0.023 | 4.5 | 891 | 113 | — | great | Present Invention Example |
| 27 | 27 | 0.030 | 4.0 | 900 | 94 | — | excellent | Present Invention Example |
| 28 | 28 | 0.036 | 5.2 | 875 | 98 | — | excellent | Present Invention Example |
| 29 | 29 | 0.033 | 5.1 | 908 | 61 | — | excellent | Present Invention Example |
| 30 | 30 | 0.040 | 5.3 | 898 | 117 | — | excellent | Present Invention Example |
| 31 | 31 | 0.030 | .3.9 | 909 | 68 | — | great | Present Invention Example |
| 32 | 32 | 0.018 | 5.9 | 885 | 104 | — | great | Present Invention Example |

Underlines indicate that the corresponding values are outside the scope of the present invention.

TABLE 3B

| Steel sheet No. | Steel No. | Amount of solid solution of Nb (mass %) | Heating rate (° C./second) | Target temperature (° C.) | Retention time (seconds) | Tempering temperature (° C.) | Evaluation of metallic gloss | Note |
|---|---|---|---|---|---|---|---|---|
| 33 | 33 | 0.037 | 3.8 | 908 | 89 | — | excellent | Present Invention Example |
| 34 | 34 | 0.021 | 3.7 | 884 | 91 | — | great | Present Invention Example |
| 35 | 35 | 0.018 | 5.8 | 905 | 89 | — | great | Present Invention Example |
| 36 | 36 | 0.016 | 3.6 | 872 | 72 | — | great | Present Invention Example |
| 37 | 37 | 0.047 | 3.0 | 874 | 60 | — | excellent | Present Invention Example |
| 38 | 38 | 0.056 | 2.6 | 895 | 72 | — | magnificent | Present Invention Example |
| 39 | 39 | 0.038 | 3.2 | 970 | 77 | — | excellent | Present Invention Example |
| 40 | 40 | 0.027 | 5.6 | 908 | 117 | — | great | Present Invention Example |
| 41 | 41 | 0.017 | 4.3 | 869 | 70 | — | great | Present Invention Example |
| 42 | 42 | 0.035 | 2.5 | 918 | 78 | — | excellent | Present Invention Example |
| 43 | 43 | 0.026 | 2.1 | 878 | 64 | — | great | Present Invention Example |
| 44 | 44 | 0.025 | 3.6 | 870 | 92 | — | great | Present Invention Example |
| 45 | 45 | 0.058 | 4.1 | 899 | 82 | — | magnificent | Present Invention Example |
| 46 | 46 | 0.030 | 2.0 | 866 | 112 | — | excellent | Present Invention Example |
| 47 | 47 | 0.015 | 2.0 | 907 | 111 | — | great | Present Invention Example |
| 48 | 48 | 0.032 | 2.6 | 871 | 93 | — | excellent | Present Invention Example |
| 50 | 4 | 0.006 | 2.5 | 920 | 74 | — | bad | Comparative Example |
| 51 | 4 | 0.032 | 5.3 | 882 | 63 | — | excellent | Present Invention Example |
| 52 | 4 | 0.004 | 3.5 | 893 | 110 | — | bad | Comparative Example |
| 53 | 4 | 0.010 | 3.6 | 883 | 60 | — | great | Present Invention Example |
| 54 | 4 | 0.026 | 5.2 | 902 | 114 | — | great | Present Invention Example |
| 55 | 4 | 0.030 | 4.6 | 918 | 41 | — | bad | Comparative Example |
| 56 | 4 | 0.032 | 4.4 | 898 | 88 | — | excellent | Present Invention Example |
| 57 | 4 | 0.022 | 4.0 | 888 | 81 | — | great | Present Invention Example |
| 58 | 4 | 0.028 | 3.1 | 891 | 32 | — | bad | Comparative Example |
| 59 | 4 | 0.031 | 5.1 | 866 | 61 | — | excellent | Present Invention Example |
| 60 | 4 | 0.033 | 5.8 | 902 | 100 | — | bad | Comparative Example |
| 61 | 4 | 0.032 | 4.4 | 886 | 89 | — | excellent | Present Invention Example |
| 62 | 4 | 0.030 | 5.7 | 892 | 88 | — | bad | Comparative Example |
| 63 | 4 | 0.025 | 4.2 | 875 | 72 | — | bad | Comparative Example |
| 64 | 4 | 0.031 | 4.8 | 884 | 117 | — | bad | Comparative Example |
| 65 | 4 | 0.023 | 3.7 | 888 | 74 | — | great | Present Invention Example |
| 66 | 49 | 0.036 | 4.3 | 892 | 71 | — | excellent | Present Invention Example |
| 67 | 50 | 0.028 | 3.9 | 898 | 82 | — | great | Present Invention Example |
| 68 | 51 | 0.032 | 4.2 | 890 | 62 | — | excellent | Present Invention Example |
| 69 | 52 | 0.035 | 5.6 | 908 | 61 | — | excellent | Present Invention Example |
| 70 | 53 | 0.032 | 6.3 | 881 | 60 | 250 | excellent | Present Invention Example |
| 71 | 54 | 0.027 | 6.5 | 889 | 58 | — | great | Present Invention Example |
| 72 | 55 | 0.031 | 4.8 | 897 | 60 | — | excellent | Present Invention Example |
| 73 | 56 | 0.035 | 4.9 | 910 | 59 | — | excellent | Present Invention Example |
| 74 | 4 | 0.033 | 3.5 | 915 | 100 | — | bad | Comparative Example |
| 75 | 4 | 0.033 | 3.5 | 915 | 101 | — | good | Present Invention Example |
| 76 | 4 | 0.033 | 4.1 | 888 | 71 | — | excellent | Present Invention Example |
| 77 | 17 | 0.054 | 5.5 | 910 | 60 | — | magnificent | Present Invention Example |
| 78 | 21 | 0.007 | 3.4 | 891 | 105 | — | bad | Comparative Example |
| 79 | 21 | 0.009 | 3.2 | 887 | 104 | — | bad | Comparative Example |
| 80 | 21 | 0.011 | 3.6 | 890 | 105 | — | good | Present Invention Example |

Underlines indicate that the corresponding values are outside the scope of the present invention.

(Al—Si Plating)

On the steel sheets manufactured as described above, Al—Si alloy plating was provided. In hot-dip plating baths of Al—Si alloys, the components of the plating baths were adjusted such that the Al content and the Si content became as shown in Table 2A and Table 2B. The steel sheets manufactured by the above-described method were immersed in the plating baths having the adjusted components, thereby obtaining Al—Si alloy-plated steel sheets shown in Table 2A and Table 2B. In addition, the totals of times during which the steel sheet was at 500° C. or higher (holding times at 500° C. or higher) in annealing before plating after coiling, cooling before plating, hot-dip plating and cooling after plating are shown in Table 2A and Table 2B.

(Ni Plating)

Next, Ni plating was provided on the Al—Si alloy-plated steel sheets. As a Ni plating bath, a Watt bath containing 200 to 400 g/L of nickel sulfate, 20 to 100 g/L of nickel chloride and 5 to 50 g/L of boric acid was used. The proportions of nickel sulfate, nickel chloride and boric acid were adjusted such that the Ni content became as shown in Table 2A and Table 2B, the pHs were adjusted to 1.5 to 2.5, and the bath temperatures were adjusted to 45° C. to 55° C. Soluble Ni was used as an anode, the current density was set to 2 A/dm$^2$, and the energization times were controlled such that the thicknesses became as shown in Table 2A and Table 2B, thereby obtaining steel sheets for hot stamping. In the steel sheets for hot stamping for which "deposition" is shown in Table 2A and Table 2B, Ni plating layers were formed not by electro plating but by deposition. Deposition plating was carried out at a degree of vacuum during deposition of $5.0 \times 10^1$ to $2.0 \times 10^{-5}$ Pa. and electron beams (voltage: 10 V, current: 1.0 A) were used as a radiation source for deposition. Individual structures of the obtained steel sheets for hot stamping were confirmed by the above-described method, and it was found that, in the area ratio of a cross section, ferrite was 10% to 40%, pearlite was 10% to 40%, bainite was 20% to 80% and the reminder was less than 5%.

(Hot Stamping)

Next, the steel sheets for hot stamping were hot-stamped under conditions as shown in Table 3A and Table 3B, thereby obtaining hot-stamping formed bodies.

(Thickness of Al—Si Alloy Plating Layer)

The thickness of the Al—Si alloy plating layer was measured as described below. The steel sheet for hot stamping obtained by the above-described manufacturing method was cut in the sheet thickness direction. After that, the cross section of the steel sheet for hot stamping was polished, in the polished cross section of the steel sheet for hot stamping, a region from the surface of the steel sheet for hot stamping to the steel sheet was linearly analyzed using a ZAF method by FE-EPMA, and the Al concentration and the Si concentration in the detected components were measured. As the measurement conditions, the accelerating voltage was set to 15 kV, the beam diameter was set to approximately 100 nm, the irradiation time per point was set to 1000 ms, and the measurement pitches were set to 60 nm. The measurement was carried out in a range where the Ni plating layer, the Al—Si alloy plating layer and the steel sheet were included. A region where the Si content was 3 mass % or more and the total of the Al content and the Si content was 95 mass % or more was determined as the Al—Si alloy plating layer, and the layer thickness of the Al—Si alloy plating layer was regarded as the length of the region in the sheet thickness direction. The layer thicknesses of the Al—Si alloy plating layer were measured at five positions at 5 μm intervals, and the arithmetic average of the obtained values was regarded as the thickness of the Al—Si alloy plating layer. The evaluation results are shown in Table 2A and Table 2B.

(Measurement of Al Content and Si Content in Al—Si Alloy Plating Layer)

Regarding the Al content and the Si content in the Al—Si alloy plating layer, according to a testing method described in JIS K 0150 (2005), a test piece is collected, the Al content and the Si content are measured at a ½ position of the total thickness of the Al—Si alloy plating layer, whereby the Al content and the Si content in the Al—Si alloy plating layer in the steel sheet for hot stamping 10 were obtained. The obtained results are shown in Table 2A and Table 2B, (Thickness of Ni Plating Layer)

The thickness of the Ni plating layer is measured by alternately repeating Ar sputtering etching and X-ray photoelectron spectroscopy (XPS) measurement. Specifically, the steel sheet for hot stamping 10 is sputtering-etched by Ar sputtering (accelerating voltage: 20 kV, sputtering rate: 1.0 nm/min), and then XPS measurement is carried out. The Ar sputtering etching and the XPS measurement are alternately carried out, and these measurements are repeated until a peak with a bonding energy of the 2p orbit of Ni in the XPS measurement of 852.5 eV to 852.9 eV appears and then disappears. The layer thickness of the Ni plating layer is calculated from the sputtering etching time and the sputtering etching rate from a position where the Ni content reaches 10 atomic % or more for the first time after the start of the sputtering to a position where the Ni content reaches less than 10 atomic %. The sputtering etching rate is obtained in terms of $SiO_2$. The thickness of the Ni plating layer is the arithmetic average value of two measurement sites. The obtained results are shown in Table 2A and Table 2B.

(Ni Content of Ni Plating Layer)

Regarding the Ni content in the Ni plating layer, the Ni content at the central position in the sheet thickness direction of the Ni plating layer obtained in the measurement of the thickness of the Ni plating layer was regarded as the Ni content of the Ni plating layer. Specifically, the arithmetic average (N=2) of values obtained in the measurement at the central position of the Ni plating layer in the sheet thickness direction was regarded as the Ni content. The obtained results are shown in Table 2A and Table 2B.

(Amount of Solid Solution of Nb)

The amount of a solid solution of Nb was measured by the following method. An electrolytic extraction (electrolytic solution: 10 vol % of acetylacetone-1 mass % of tetraammonium chloride-methanol) residue was separated, then, only this residue was dissolved by a sulfuric phosphoric acid white fume treatment, the solution was analyzed by ICP-AES, and the amount of Nb precipitated (insol. Nb) was determined. Next, insol. Nb was subtracted from the total amount of Nb of the steel sheet, thereby obtaining the amount of a solid solution of Nb (sol. Nb). At this time, insol. Nb is rounded down after to four decimal places (mass %). The total amounts of Nb of the steel sheets are numerical values for Nb in Table 1A and Table 1B. The obtained amounts of the solid solutions of Nb are shown in Table 3A and Table 3B.

(Corrosion Resistance)

The corrosion resistance of the hot-stamping formed body was evaluated by a cyclic neutral salt spray test (CCT) based on 8.1 of JIS H8502: 1999. However, 8.1.2b) of the above-described regulation was changed such that sodium chloride was dissolved so as to be 70 g per liter of a testing solution. Specifically, the hot-stamping formed body was taken out after 2 cycles of CCT, 5 cycles of CCT and 10 cycles of CCT, and the metallic gloss retention rates of the base material were evaluated. A case where 50% or more of the metallic gloss of the base material was retained until 10 cycles of CCT was evaluated as 'magnificent', a case where 50% or more of the metallic gloss of the base material was retained until 5 cycles of CCT was evaluated as 'excellent', a case where 60% or more of the metallic gloss of the base material was retained until 2 cycles of CCT was evaluated as 'great', a case where 60% to 30% of the metallic gloss of the base material was retained was evaluated as 'good', and, a case where 30% of the metallic gloss of the base material could not be retained until 2 cycles of CCT was evaluated as 'bad'. 'Magnificent' to 'good' were regarded as acceptable, and 'bad' was regarded as unacceptable. The results are shown in Table 3A and Table 3B.

As shown in Table 3A and Table 3B, Steel Sheets Nos. 2 to 12, 14 to 19, 21 to 48, 51, 53, 54, 56, 57, 59, 61, 65 to 73, 75 to 77 and 80 were excellent in terms of corrosion resistance.

In Steel Sheet No. 1, since the Ni content in the Ni plating layer was 75%, the corrosion resistance was inferior.

In Steel Sheet No. 13, since the Mn content in the steel sheet was 0.16%, the amount of the solid solution of Nb in the steel sheet was less than 0.010%. Therefore, the corrosion resistance was inferior.

In Steel Sheet No. 20, since the amount of all Nb in the steel sheet was 0.008%, the amount of the solid solution of Nb in the sheet became less than 0.010%. Therefore, the corrosion resistance was inferior.

In Steel Sheet No. 50, since the heating temperature was lower than 1200° C., the amount of the solid solution of Nb in the steel sheet was less than 0.010%. Therefore, the corrosion resistance was inferior.

In Steel Sheet No. 52, since the coiling temperature was higher than 500° C., the amount of the solid solution of Nb in the steel sheet was less than 0.010%. Therefore, the corrosion resistance was inferior.

In Steel Sheet No. 55, since the Si content in the Al—Si alloy plating layer was less than 3%, the adhesion of scale was poor. Therefore, the corrosion resistance was inferior.

In Steel Sheet No. 58, since the Si content in the Al—Si alloy plating layer was more than 20%, the adhesion of scale was poor. Therefore, the corrosion resistance was inferior.

In Steel Sheet No. 60, since the thickness in the Al—Si alloy plating layer was less than 7 μm, the adhesion of scale was poor. Therefore, the corrosion resistance was inferior.

In Steel Sheet No. 62, since the Ni content in the Ni plating layer was 85 mass %, the corrosion resistance was inferior.

In Steel Sheet No. 63, since no Ni plating layer was provided, the corrosion resistance was inferior.

In Steel Sheet No. 64, since the thickness of the Ni plating layer was 200 nm or less, the corrosion resistance was inferior.

In Steel Sheet No. 74, since the Ni content in the Ni plating layer was 90 mass %, the corrosion resistance was inferior.

In Steel Sheet No. 78, since the holding time at 500° C. or higher was longer than 180 seconds, the corrosion resistance was inferior.

In Steel Sheet No. 79, since the holding time at 500° C. or higher was longer than 180 seconds, the corrosion resistance was inferior.

INDUSTRIAL APPLICABILITY

According to the present invention, hot-stamping formed bodies have excellent corrosion resistance after hot stamping and are thus highly applicable industrially.

BRIEF DESCRIPTION OF THE REFERENCE SYMBOLS

1 Base material
2 Al—Si alloy plating layer
3 Ni plating layer
10 Steel sheet for hot stamping

The invention claimed is:
1. A steel sheet for hot stamping comprising:
in this order,
a base material;
an Al—Si alloy plating layer in which an Al content is 75 mass % or more, a Si content is 3 mass % or more and a total of the Al content and the Si content is 95 mass % or more; and
a Ni plating layer having a Ni content of more than 92 mass %;
wherein the base material has a chemical composition of, by mass %:
C: 0.01% or more and less than 0.70%;
Si: 0.005% to 1.000%;
Mn: 0.40% to 3.00%;
Nb: 0.010% to 0.200%;
a solid solution of Nb: 0.010% to 0.150%;
sol. Al: 0.00020% to 0.50000%;
P: 0.100% or less;
S: 0.1000% or less;
N: 0.0100% or less;
Cu: 0% to 1.00%;
Ni: 0% to 1.00%;
V: 0% to 1.00%;
Ti: 0% to 0.150%;
Mo: 0% to 1.000%;
Cr: 0% to 1.000%;
B: 0% to 0.0100%;
Ca: 0% to 0.010%;
REM: 0% to 0.300%; and
a remainder: Fe and an impurity,
the Al—Si alloy plating layer has a thickness of 7 to 148 μm, and
the Ni plating layer has a thickness of more than 200 nm and 2500 nm or less.
2. The steel sheet for hot stamping according to claim 1, wherein the chemical composition of the base material contains, by mass %, one or more selected from the group of:
Cu: 0.005% to 1.00%;
Ni: 0.005% to 1.00%;
V: 0.01% to 1.00%;
Ti: 0.010% to 0.150%;
Mo: 0.005% to 1.000%;
Cr: 0.050% to 1.000%;
B: 0.0005% to 0.0100%;
Ca: 0.001% to 0.010%; and
REM: 0.001% to 0.300%.
3. The steel sheet for hot stamping according to claim 1, wherein a ratio of Ni/Cr in the Ni plating layer is 15 or more.

4. The steel sheet for hot stamping according to claim 1, wherein a Cr content in the Ni plating layer is 6.0 mass % or less.

\* \* \* \* \*